(12) United States Patent
Whitman et al.

(10) Patent No.: US 7,295,977 B2
(45) Date of Patent: Nov. 13, 2007

(54) EXTRACTING CLASSIFYING DATA IN MUSIC FROM AN AUDIO BITSTREAM

(75) Inventors: Brian Whitman, New York, NY (US); Gary W. Flake, Lawrenceville, NJ (US); Stephen R. Lawrence, New York, NY (US)

(73) Assignee: NEC Laboratories America, Inc., Princeton, NJ (US)

( * ) Notice: Subject to any disclaimer, the term of this patent is extended or adjusted under 35 U.S.C. 154(b) by 508 days.

(21) Appl. No.: 09/939,954

(22) Filed: Aug. 27, 2001

(65) Prior Publication Data

US 2003/0040904 A1 Feb. 27, 2003

(51) Int. Cl.
*G10L 15/16* (2006.01)
*G10H 7/10* (2006.01)

(52) U.S. Cl. .................. 704/236; 704/232; 84/616
(58) Field of Classification Search ................ 74/212; 704/205, 207, 232, 270, 212, 245, 236–239; 707/6, 707; 84/616
See application file for complete search history.

(56) References Cited

U.S. PATENT DOCUMENTS

| | | | | |
|---|---|---|---|---|
| 4,843,562 A | * | 6/1989 | Kenyon et al. ............. 702/73 |
| 5,335,291 A | * | 8/1994 | Kramer et al. ............ 382/158 |
| 5,479,575 A | * | 12/1995 | Yoda ........................ 706/20 |
| 5,546,477 A | * | 8/1996 | Knowles et al. .......... 382/242 |
| 5,619,616 A | * | 4/1997 | Brady et al. ............... 706/20 |
| 5,763,800 A | * | 6/1998 | Rossum et al. ............ 84/603 |
| 5,918,223 A | * | 6/1999 | Blum et al. ................. 707/1 |
| 5,969,654 A | * | 10/1999 | Goldin ...................... 341/141 |
| 6,192,360 B1 | * | 2/2001 | Dumais et al. .............. 707/6 |
| 6,201,176 B1 | * | 3/2001 | Yourlo ...................... 84/609 |
| 6,657,117 B2 | * | 12/2003 | Weare et al. ............... 84/668 |
| 6,697,564 B1 | * | 2/2004 | Toklu et al. ............... 386/54 |
| 6,931,451 B1 | * | 8/2005 | Logan et al. .............. 709/231 |

OTHER PUBLICATIONS

Matityaho et al; "Neural Network Based Model for Classification of Music Type;" Electrical and Electronics Engineers in Israel, 1995., Eighteenth Convention of , Mar. 7-8, 1995, pp. 4.3.4/1-4.3.4/5.*

(Continued)

*Primary Examiner*—Patrick N. Edouard
*Assistant Examiner*—James S. Wozniak
(74) *Attorney, Agent, or Firm*—Scully, Scott, Murphy & Presser, P.C.

(57) ABSTRACT

The method of the present invention utilizes machine-learning techniques, particularly Support Vector Machines in combination with a neural network, to process a unique machine-learning enabled representation of the audio bitstream. Using this method, a classifying machine is able to autonomously detect characteristics of a piece of music, such as the artist or genre, and classify it accordingly. The method includes transforming digital time-domain representation of music into a frequency-domain representation, then dividing that frequency data into time slices, and compressing it into frequency bands to form multiple learning representations of each song. The learning representations that result are processed by a group of Support Vector Machines, then by a neural network, both previously trained to distinguish among a given set of characteristics, to determine the classification.

15 Claims, 3 Drawing Sheets

OTHER PUBLICATIONS

H. Soltau, T. Schultz, Martin Westphal, and Alex Waibel. "Recognition of Music Types". ICASSP 1998, vol. II, pp. 1137-1140, 1998.*

Herrera, Perfecto; Amatriain, Xavier; Batlle, Eloi and Serra, Xavier. "Towards instrument segmentation for music content description: a critical review of instrument classification techniques." Proceedings of ISMIR 2000, Plymouth MA, 2000.*

Pye, "Content-Based Methods for the Management of Digital Music," in Proc. Int. Conf Acoustics, Speech, Signal Processing (ICASSP), 2000.*

Scott, "Music Classification Using Neural Networks," Tech. Rep., Stanford University, 2001.*

"An Overview of Audio Information Retrieval," J. Foote, ACM-Springer Multimedia Systems, 1998. "Towards Instrument Segmentation for Music Content Description: a Critical Review of Instrument Classification Techniques," Herrera, P. et al., Proceedings of ISMIR 2000, Plymouth, MA.

"Audio Information Retrieval (AIR) Tools," Tzanetakis, G. et al., Proceedings of ISMIR 2000, Plymouth, MA." "Arthur: Retrieving Orchestral Music by Long-Term Structure," J. Foote, Proceedings of ISMIR 2000, Plymouth, MA" "Mel Frequency Cepstral Coefficients for Music Modeling," B. Logan, Proceedings of ISMIR 2000.

Moodlogic, www.Moodlogic.com, http://www.moodlogic.com/p117.html. Relatable, www.Relatable.com, http://www.relatable.com/tech/engine.html.

"A Comparison of Language modeling and Probabilistic Text Information Retrieval Approaches to Monophonic Music Retrieval," J. Pickens, Proceedings of ISMIR 2000, Plymouth, MA. "NODElib Documentation," G.W. Flake,http://www.neci.nj.nec.com/homepages/flake/nodelib/html /.

"Efficient SVM Regression Training with SMO," Machine Learning, to appear 2001, G.W. Flake, et al. "Musical Instrument Identification: A Pattern-Recognition Approach," K.D. Martin, et al., Presented at the 136th Meeting of the Acoustical Society of America, 1998.

"A Tutorial on Support Vector Machines for Pattern Recognition," C.J.C. Burges, Kluwer Academic Publishers, Boston, Manufactured in The Netherlands, 1998; "Neural Networks for Real World Tasks Limitations and Solutions," S.R. Lawrence, p. 39 of thesis dated Aug. 12, 1996.

The Nature of Statistical Learning Theory, V.N. Vapnik, pp. 133-141, 1995. Bitbop, www.Bitbop.com, http://www.bitbop.com/press-bp20010508.html.

* cited by examiner

EXTRACTING CLASSIFYING DATA IN MUSIC FROM AN AUDIO BITSTREAM

BACKGROUND OF THE INVENTION

1. Field of the Invention

The invention relates generally to the fields of computer science, machine learning, artificial intelligence, and digital signal processing, and more specifically, to a combination of machine learning and digital signal processing that allows a computer to learn an audio bitstream, also known as "machine listening". The machine listening technique allows the computer to extract artist and/or genre information from a piece of music with which it may not have previously experienced, but whose characteristics it has gleaned by exposure to other pieces of the same artist and/or genre.

2. Description of the Prior Art

Song recognition systems can be a boon to copyright holders who need to check if their work is being distributed criminally or via unauthorized means. The present downside of such systems is that they must include a representation of each song owned, which for large record labels and song collections can be all but impossible. Queries made within this search space could feasibly take too much processing time. Further, new songs would have to be added manually.

A system that could identify the artist of an unknown piece of music, instead of identifying a particular song, solves these problems since the copyright holder need only provide a few representative samples of each artist. The system will 'infer' the set of features that makes this artist unique and classifiable. Future classifications happen on completely unknown music and match very quickly to a previously-learned feature space.

There is a recent spate of interest in music retrieval from both the frequency (e.g., recorded or digital audio) and score (e.g., notes, transcriptions) domains. Most music retrieval research efforts deal with classification of instrument type, and in some cases genre.

Foote gives an overview of audio information retrieval from the starting point of speech recognition and retrieval, referring to the music domain as "a large and extremely variable audio class." See, "An Overview of Audio Information Retrieval," ACM-Springer Multimedia Systems, 1998.

As well, Herrera et al. overviews the various classification techniques used on digital audio. See, "Towards Instrument Segmentation for Music Content Description: a Critical Review of Instrument Classification Techniques," Proceedings of ISMIR 2000, Plymouth, Mass. Herrera, et al., discusses such methods as K-nearest neighbor (K-NN), naive Bayesian classifiers, discriminant analysis, neural networks and support vector machines (SVM).

Tzanetakis, et al., discuss their audio retrieval system MARSYAS, which operates on various representations of audio to predict genre and classify music from speech. See, "Audio Information Retrieval (AIR) Tools," Proceedings of ISMIR 2000, Plymouth, Mass. The classification techniques used include Gaussian Mixture Models and K-nearest neighbor algorithms.

Martin, et al., also use K-NN for instrument identification, with an overall identification success rate of 70%. See, "Musical Instrument Identification: A Pattern-Recognition Approach," Presented at the $136^{th}$ Meeting of the Acoustical Society of America, 1998.

Foote discusses using dynamic programming to retrieve orchestral music by similarity, starting with an energy representation composed of the peak RMS value of each one-second slice of music. See, "ARTHUR: Retrieving Orchestral Music by Long-Term Structure," Proceedings of ISMIR 2000, Plymouth, Mass. He then moves onto a purely spectral feature space. The dynamic programming methods used to retrieve similar music (different performances of the same piece, for example) proved adequate for the small corpus used. Music data as lexemes for search and classification is also discussed at the score level in Pickens. See, "A Comparison of Language modeling and Probabilistic Text Information Retrieval Approaches to Monophonic Music Retrieval," Proceedings of ISMIR 2000, Plymouth, Mass.

Logan describes the use of MFCCs for the task of music modeling. See, "Mel Frequency Cepstral Coefficients for Music Modeling," Proceedings of ISMIR 2000, Plymouth, Mass. The MFCC is presented as a smarter Fast Fourier Transform (FFT), in that it is scaled to a more psychoacoustically sound frequency growth, and also has a built-in discrete cosine transform (DCT) step to approximate principal component analysis for de-correlation. Her experiments in music/not music separation show promise for the MFCC in high-level music retrieval.

There are a few commercially oriented music recommending and copyright protection systems that operate on the spectral features of music. Such examples are Moodlogic (at www.Moodlogic.com), whose information is limited to select features of music, and the song-recognition components used by Relatable Technologies (www.relatable.com), cannot infer artist information from its feature space.

BRIEF SUMMARY OF THE INVENTION

The system of the present invention uses a combination of machine learning techniques, such as neural networks and support vector machines, with a music-specific representation generator to classify audio data.

Specifically, the present invention begins with an audio signal converted into a Pulse Code Modulated bitstream capable of being machine processed. This bitstream is then transformed into a perceptual representation of the constituent frequencies that make up the audio signal.

To facilitate processing by machine-learning techniques, the perceptual representation is divided into time slices. The frequency data of the perceptual representation is then compressed into a smaller number of frequency bands. The result is a learning representation for each time slice of the audio signal. The slice representation of audio adequately describes the piece of music and its performers and production for search and retrieval tasks.

This learning representation is then processed in a multistage classifier by a number of support vector machines, each trained to identify a particular characteristic. The results of each support vector machine are collected into a metalearner vector, which is input into a neural network, also trained to discriminate among a set of characteristics. The neural network, using the metalearner vector as input, makes the classification.

This system could be used by copyright holders to quickly search large music databases for instances of an artist's work. Conversely, it could be used by end-users who wish to find music by a particular artist. It can also be used in converting large sets of music data to the digital domain; instead of manually entering artist information, the system could automatically make the classification. The representation generated by the system of the present invention can also be used as a recommendation agent for content-based music retrieval.

BRIEF DESCRIPTION OF THE DRAWINGS

These and other features, aspects, and benefits of the present invention will become better understood with regard to the following description, appended claims, and accompanying drawings, where like reference numerals refer to like components across the several views:

DETAILED DESCRIPTION OF THE INVENTION

Figure 1:
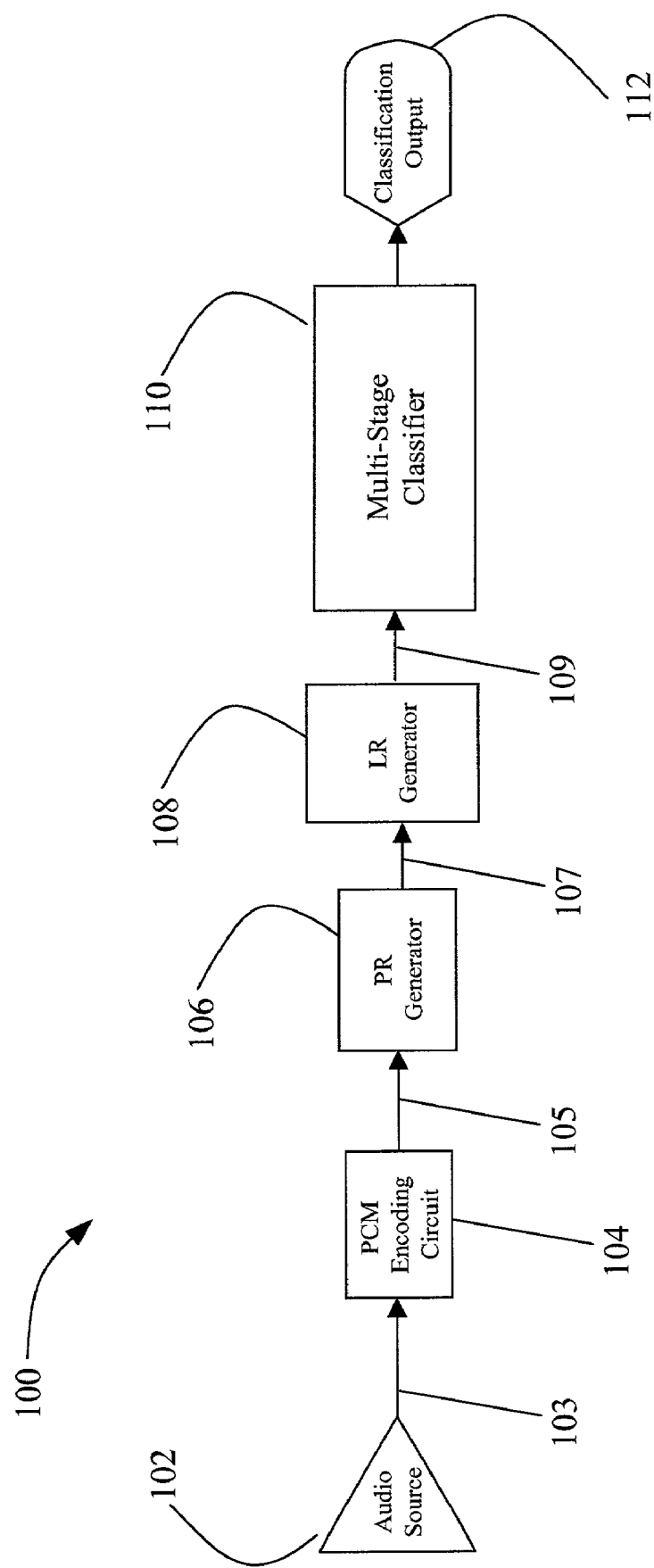
FIG. 1 shows the flow path of a Music Classifier according to the present invention.

Referring to FIG. 1, the system 100 begins by receiving an audio signal from some source 102. The source 102 generates a signal 103 which contains audio content, which can be a recording from CD or other media, a received broadcast, a file that stores the music data, or even input from a live performance. The signal 103 is either re-sampled or directly copied by a Pulse Code Modulation (PCM) encoding circuit 104, which outputs a digital representation of audio signal 103, which is audio bitstream 105.

Next, the audio bitstream 105 is transformed by a perceptual representation (PR) generator 106 into PR 107. From this PR, a learning representation (LR) generator 108 transforms the PR into LRs 109. The LRs 109 output from the LR generator 108 are input into a multi-stage classifier 110, which after proper training will be capable of distinguishing between a variety of artists to which it has been exposed. An output 112 will be the classification of source 102 into one of a number of categories, for example by artist.

Figure 2:
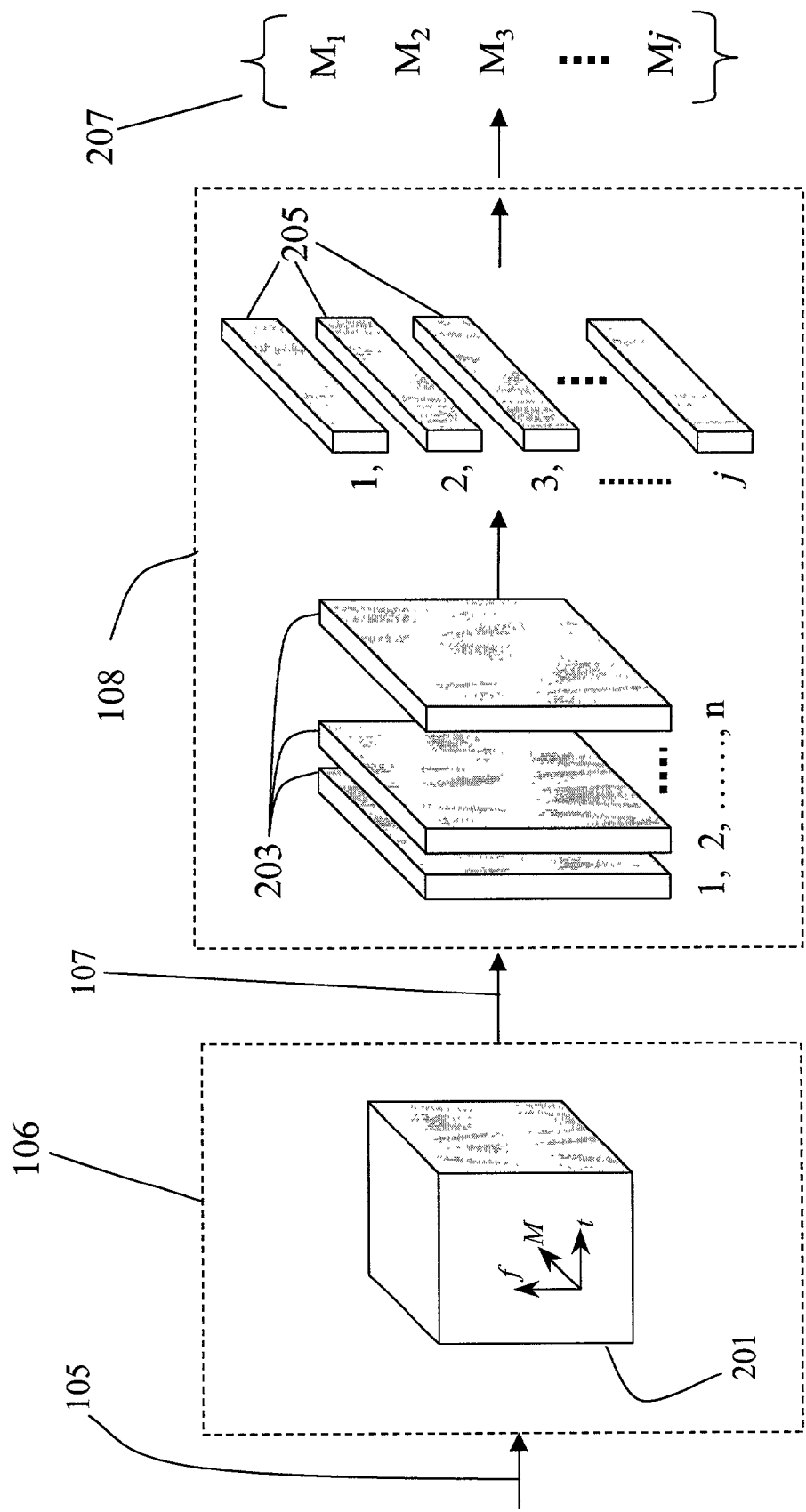
FIG. 2 shows the flow path of the Learning Representation Generator according to the present invention.

Referring to FIG. 2, the complete formation of LRs 109 from the bitstream 105 is shown schematically. The bitstream 105 is a representation of the audio signal 103, sampled and measured at fixed time intervals. However, a system that attempts to hear as a person must be able to interpret the encoding that enables ears to vibrate, namely, the frequency domain.

A preferred method of transforming bitstream 105 into a PR 107 is the Fast Fourier Transform (FFT). PR generator 106 performs the FFT, in accordance with the criterion described below, resulting in the PR 107. In the case of the FFT, the output is the coefficients of the sine and cosine components of frequency vectors given an n-sampled time series. The choice of n can vary depending on performance requirements. Larger windows get more done at once, but introduce latency into 'real-time' analyses. A 1,024-sample time window was found suitable.

The nature of PCM sampling is such that the sampling rate must be twice that of the highest frequency of the signal being sampled, known as the Nyquist Criterion. In the case of CD audio, that sampling rate is 44 kHz. Further, the nature of the FFT is such that it will compute the component magnitudes of n frequency vectors as high as the sampling rate. It is known, however, from the Nyquist Criterion, that there can be no frequencies greater than ½the sampling rate accurately represented in the PCM data. Further, it has been shown that the magnitudes are a mirror image, along the frequency domain. Moreover, frequencies above 22 kHz are too high to be relevant to the audio signal being transformed. Therefore, to avoid the effects of this mirroring, frequency components above 22 kHz are discarded.

This leaves the sine and cosine component magnitude weights of 512 frequency vectors between 0 Hz and 22 kHz. The magnitude of each frequency vector is calculated, using the Pythagorean theorem, from these sine and cosine component magnitudes. The result is, for each 1,024-sample time window, a value of the magnitude of the each of the 512 constituent frequency vectors that make up the audio at that time.

Therefore, the PR generator 106 performs the above FFT calculations, and the resulting data is then represented conveniently in a three dimensional matrix 201 having dimensions of time (t), frequency (f), and magnitude (M). This matrix 201 of frequency magnitudes is the perceptual representation 107 of the audio bitstream 105.

Within LR generator 108, this matrix 201 is then divided along the time domain into n sequentially indexed discrete time slices 203, for example 1.2 seconds long. In the exemplary embodiment, a time slice 203 was comprised of 12 time-sample windows. The frequency magnitudes were averaged across the time-sample windows which make up a given time slice 203. Therefore, each time slice 203 will have only one average magnitude at each frequency.

For effective machine learning, 512 dimensions are still far too many given the limited number of examples for training and classification. To alleviate this, each time slice 203 is then subdivided into j sequentially indexed frequency bands 205. In testing, best results were achieved where j=20.

Further, the size of each frequency band should be chosen to reflect where the most salient information typically lies. Most information in music happens across the lower-end of the spectrum, below 11 kHz. Moreover, octave sizes grow logarithmically according to the golden ratio ($A_4$=440 hz, $A_5$=880 hz, $A_6$=1760 hz, etc.). The size of each frequency band should grow according to this golden ratio in order to best capture the frequency information closely grouped at the lower frequencies.

The magnitudes of each frequency component vector within a given band are averaged into a scalar dimension $M_i$. The LRs 109 output from the LR generator 108 are in the form of LR Vectors 207. There are j number of dimensions $M_i$ comprising each LR Vector 207, i being the index of each dimension's corresponding frequency band 205. Each LR Vector 207 represents one time slice of a song.

Figure 3:
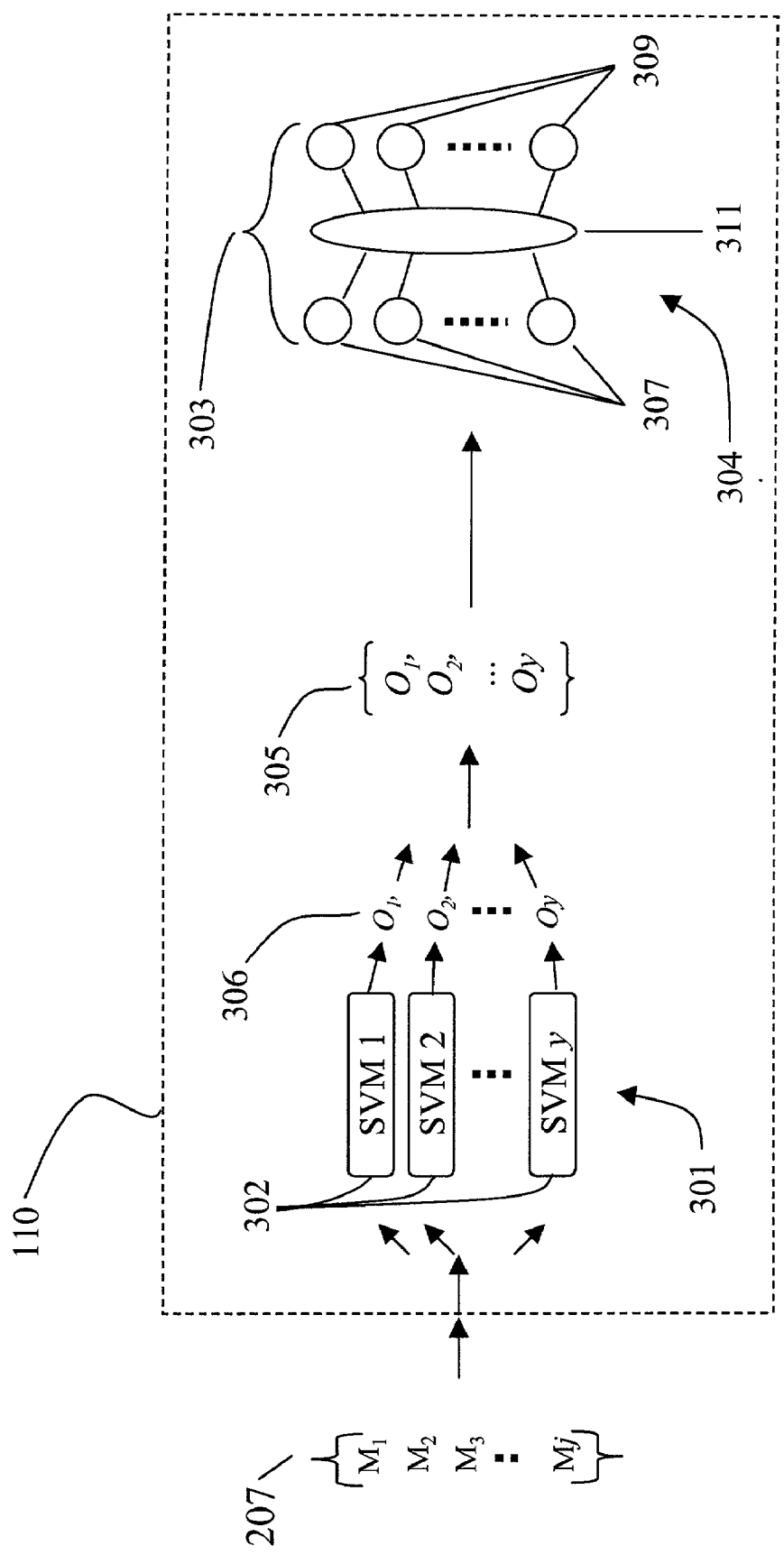
FIG. 3 shows the flow path of the multi-stage classifier according to the present invention.

Referring now to FIG. 3, the multi-stage classifier 110 of the present invention is illustrated schematically. A first stage 301 comprises y number of SVMs 302, each trained to recognize the LRs of a particular artist. An unknown LR Vector 207 is then presented to each SVM 302. Each SVM 302 will output a value O 306, between 1 and −1, depending on how well or poorly, respectively, the characteristics of that particular LR vector 207 conform to the characteristics each SVM 302 has been trained to recognize.

Training an SVM 302 entails presenting a number of LR vectors 207 of a given characteristic, e.g. artist, to an SVM 302, while instructing it to hold its output value O 306 to a value near 1. Training further entails presenting a number of LR Vectors 207 of differing characteristics, i.e., belonging to different artists, while instructing the SVM 302 to hold its output value O 306 to a value near −1. Over several representative LR Vectors, the SVM will infer the particular frequency magnitudes and relationships therebetween that are unique to a given artist.

At this first stage, if all one wished was a yes/no indication on one particular characteristic, e.g., artist, genre, etc., then a single SVM 302 would suffice. However, for discrimination among multiple artists, it would not be possible for even a human viewing the multiple SVM 302 outputs to intuit the correct artist. To accomplish this, a "Metalearner" machine is required. The final stage 304 of the multi-stage classifier 110 is a metalearner. In the present invention, final stage 304 is a neural network 303.

The output value O 306 of each SVM 302 based on each LR Vector 207 is arranged into a Metalearner vector 305. This Metalearner vector 305 is then presented to the neural network 303 to make the final classification.

Neural network 303 has y input nodes 307, one for each output of each SVM 302, and also y output nodes 309. Neural network 303 also has a hidden layer 311, comprised of hidden nodes, not pictured. In the exemplary embodiment, the neural network 303 has a set of double-precision floating point values as each input node. As is typical of such systems, neural network 303 will assign an output value between 0 and 1 to each output node in response to an input.

To train neural network 303, the Metalearner vectors 305 corresponding to known artists were input, while the output node corresponding to the correct artist was set to 0.9, and all other output nodes were set to 0.1. It is known to avoid the extremes of the output range when teaching a system of this type.

When the neural network 303 completes training, it writes a binary representation of the network to disk. The activation function of the neural network 303, number of hidden nodes in the hidden layer 311, and learning algorithm could all be altered at run time. For example, a Gaussian activation function performed best over the mostly-noisy audio data, and having at least as many hidden nodes as input nodes supported high testing accuracies.

One feature of the classification process is its confidence evaluation. Using the learning representation vectors 207 of the time slices 203, a number of examples within a set are close enough to each other that the neural network 303 could become confused and assign low scores to each output unit, essentially failing to make any classification. However, since there are a large number of slices per song, one could easily "throw away" many of the neural net's weaker decisions if it was known that they weren't as strong as others.

To account for this, the present system includes a confidence metric, which defines confidence as the maximum value among classification output nodes 309 of neural net 303, subtracted by the second-highest value among output nodes 309, multiplied by the maximum again. Only determinations that have a confidence above 0.1 are included.

During the classifying process, the artist corresponding to the output node 309 that had the most of these over-threshold determinations was assigned to the song.

Each song s is divided into n parts. Eventually only 1 out of every k parts is used to make the classification. Each part out of song s is defined as j frequency bands distributed along the audio spectrum. An LR vector 207 then becomes an "example" for a training system, with each s containing n/k LRs.

The length of a given slice n, in seconds, has been tested between 0.09 seconds to 2.0 seconds. Best results were found around the "two-beat long" length of about 0.8-1.2 second, which is approximately 2 beats at the most common tempo of 120 beats per second. It would take someone 2 beats to identify the changes that define music, and this follows over to the digital domain as well.

Frequency banding determines the count j in the slice representation. Each slice is a group of bands along the frequency vector. At j=10, for example, we split the frequency vector into 10 divisions and use the magnitude of each range. Unfortunately, a 10-band arrangement doesn't work very well. Much better results were found with a number in the range of 20-40, preferably 20.

Lastly, there is the skip parameter, k. If every single slice in the audio were used, there would simply be too much data. For example, a 3:05 song will produce over 150 slices of 1.2 s each, more than are necessary for either learning or recognition given the limited dimensions of the LR vector 207. It speeds both the learning and recognition processes, without impacting accuracy, to consider only a fraction of the slices available. Only every $k^{th}$ slice, in testing k=2, contribute to the total representation processed.

It should be noted that Support Vector Machine is used as a term of art, where the word 'machine' is itself a colloquialism. What is referred to is a learning process, several of which may be performed on one or more machines. Similarly with respect to the neural network, the reference is to the process, not specifically the apparatus. However, this should not be misunderstood to imply that the present invention is limited to the processes disclosed. An embodiment of the invention may comprise a computer apparatus to perform the data extraction and classification according to the present invention, and/or computer readable media storing therein a program of instructions instructing a computer to carry out the data extraction and classification of the present invention.

The overall system 100 can be viewed as composed of a series of interconnected modules with swappable 'glue' layers. This design allows the system to perform various music retrieval related tasks in permuted configurations. The glue layer between each module can be a link over networks, for example via a TCP/IP layer, or on disk or memory, e.g., through an XML data storage mechanism.

Some modules contemplated include those that transfer a CD source into PRs. Another takes an MP3 file and likewise transfers it into PRs. Still a third can take buffered live input data, for example in the Steinberg VST format, and transfer this into PRs.

A module sequentially later in the classification process could take the PRs and convert them into LRs according to our inventive process. Still later in the process is a module that can take the LRs and perform a learning operation, or selected combination of learning operations.

The exemplary embodiment of the invention has been described with respect to a system for classifying the artist of a piece of music. However, the invention is not limited to that use, as it would be equally applicable to discriminate among genres, or other characteristics.

Certain other alterations and modifications may be apparent to those skilled in the art, without departing from the scope of the invention. The exemplary embodiment is not meant to be limiting on the scope of the invention, which is defined by the appended claims.

To be secured by United States Letters Patent, what is claimed is:

1. A method of extracting classifying data from an audio signal, the method comprising the steps of:
   transforming a perceptual representation of the audio signal into a learning representation of the audio signal;
   transmitting the learning representation to a multi-stage classifier, the multi-stage classifier comprising:
   a first stage having a plurality of support vector machine classifiers, each support vector machine classifier trained to identify one out of a plurality of audio classification categories and generate a metalearner vector value reflecting how closely the audio signal conforms to the one out of the plurality of audio classification categories, and a final stage having a metalearner classifier, the metalearner classifier using the generated metalearner vector to classify the audio signal into one out of the plurality of audio classification categories; and generating classification category information for the audio signal based on results produced by the metalearner classifier.

2. The method of claim 1 wherein the final stage metalearner classifier is a neural network classifier.

3. The method of claim 1 wherein said audio classification categories comprises classifications by musical artist.

4. The method of claim 1 wherein the learning representation comprises dividing the perceptual representation of the audio signal into a plurality of time slices.

5. The method of claim 1 wherein the learning representation comprises dividing the perceptual representation of the audio signal into a plurality of frequency bands.

6. A computer readable storage medium, storing therein a program of instructions for causing a computer to execute a process of extracting classifying data from an audio signal, the process comprising the steps of:

processing a perceptual representation of the audio signal into a learning representation of the audio signal; and inputting the learning representation into a multi-stage classifier, the multi-stage classifier comprising a first stage of support vector machine classifiers and a final stage metalearner classifier, each support vector machine classifier trained to identify one out of a plurality of audio classification categories and where the support vector machine classifiers are used to generate a metalearner vector that allows the final stage metalearner classifier to classify the audio signal into one out of the plurality of audio classification categories, each support vector machine classifier outputting a value reflecting how closely the audio signal conforms to the one out of the plurality of audio classification categories, each value then used in the metalearner vector.

7. The computer readable storage medium of claim 6 wherein the final stage metalearner classifier is a neural network classifier.

8. The computer readable storage medium of claim 6 wherein said audio classification categories comprises classifications by musical artist.

9. The computer readable storage medium of claim 6 wherein the learning representation comprises dividing the perceptual representation of the audio signal into a plurality of time slices.

10. The computer readable storage medium of claim 6 wherein the learning representation comprises dividing the perceptual representation of the audio signal into a plurality of frequency bands.

11. An apparatus for classifying an audio signal comprising:

means for processing a perceptual representation of the audio signal into a learning representation of the audio signal; and a multi-stage classifier, the multi-stage classifier further comprising a first stage of support vector machine classifiers and a final stage metalearner classifier, each support vector machine classifier trained to identify one out of a plurality of audio classification categories from the learning representation of the audio signal and where the support vector machine classifiers are used to generate a metalearner vector that allows the final stage metalearner classifier to classify the audio signal into one out of the plurality of audio classification categories, each support vector machine classifier outputting a value reflecting how closely the audio signal conforms to the one out of the plurality of audio classification categories, each value then used in the metalearner vector.

12. The apparatus of claim 11 wherein the final stage metalearner classifier is a neural network classifier.

13. The apparatus of claim 11 wherein said audio classification categories comprises classifications by musical artist.

14. The apparatus of claim 11 wherein the learning representation comprises dividing the perceptual representation of the audio signal into a plurality of time slices.

15. The apparatus of claim 11 wherein the learning representation comprises dividing the perceptual representation of the audio signal into a plurality of frequency bands.

* * * * *